United States Patent
Dick

(10) Patent No.: US 6,776,431 B1
(45) Date of Patent: Aug. 17, 2004

(54) FIFTHWHEEL TRAILER TO GOOSENECK HITCH ADAPTOR

(75) Inventor: Bernard L. Dick, Chanute, KS (US)

(73) Assignee: PopUp Industries, Inc., Chanute, KS (US)

(*) Notice: Subject to any disclaimer, the term of this patent is extended or adjusted under 35 U.S.C. 154(b) by 0 days.

(21) Appl. No.: 10/378,308

(22) Filed: Mar. 3, 2003

(51) Int. Cl.[7] .................................... B60D 1/07
(52) U.S. Cl. ..................... 280/425.2; 280/416.1
(58) Field of Search ..................... 280/416.1, 418.1, 280/425.2, 415.1, 416.3, 417.1

(56) References Cited

U.S. PATENT DOCUMENTS

| | | | | |
|---|---|---|---|---|
| 3,796,444 A | * | 3/1974 | Hixon | 280/483 |
| 3,913,948 A | * | 10/1975 | Gee et al. | 280/415.1 |
| 4,887,831 A | * | 12/1989 | Edwards | 280/416.3 |
| 5,240,270 A | | 8/1993 | Colibert | |
| 5,344,172 A | * | 9/1994 | Jaun | 280/415.1 |
| 5,513,869 A | * | 5/1996 | Putnam | 280/415.1 |
| 5,868,415 A | | 2/1999 | Van Vleet | |
| 5,890,728 A | | 4/1999 | Zilm | |
| 6,024,372 A | * | 2/2000 | Colibert et al. | 280/417.1 |
| 6,135,482 A | * | 10/2000 | Larkin | 280/416.1 |
| 6,416,073 B1 | * | 7/2002 | Marcy | 280/416.1 |
| 6,540,246 B2 | | 4/2003 | Andersen et al. | |
| 2002/0060442 A1 | | 5/2002 | Andersen et al. | |
| 2003/0173757 A1 | * | 9/2003 | Smith | 280/417.1 |

* cited by examiner

*Primary Examiner*—Avraham Lerner
(74) *Attorney, Agent, or Firm*—Shook, Hardy & Bacon LLP

(57) ABSTRACT

An adaptor for permitting a user to couple a fifthwheel trailer having a kingpin to a tow vehicle having a gooseneck hitch mechanism with a hitch ball is provided. The adaptor includes an upper portion which receives a portion of the kingpin and is forced into abutting contact with a kingpin plate of the trailer by a clamp member. A lower portion of the adaptor mates with the upper portion in telescoping fashion to provide adjustability. A hitch ball coupler for receiving the hitch ball of the gooseneck hitch mechanism is provided at a bottom of the lower portion. Once the converter is attached to the kingpin of the fifthwheel trailer, the trailer functions as any other gooseneck trailer.

20 Claims, 6 Drawing Sheets

FIFTHWHEEL TRAILER TO GOOSENECK HITCH ADAPTOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to compatibility between gooseneck and fifthwheel towing devices. More particularly, this invention relates to a device that permits the coupling of a fifthwheel trailer having a kingpin to a tow vehicle with a gooseneck trailer hitch mechanism having a hitch ball.

Two common hitch types exist to permit users to tow large trailers. One hitch type is a fifthwheel mechanism and the other hitch type is a gooseneck hitch mechanism. Both hitch types have advantages and disadvantages. Both types are generally mounted in the bed of a truck above or slightly forward of its rear axle. In a fifthwheel arrangement, the trailer generally has a downwardly depending post that terminates in a fifthwheel kingpin plate. The plate generally has a kingpin extending downwardly therefrom. A fifthwheel receiver is mounted in the bed of a truck for receiving the kingpin. The receiver is similar in appearance and functions similar to the device on the back of a semi-truck. The receiver is a generally horseshoe shaped device with a flat upper surface. The kingpin is received in the center of the horseshoe shaped receiver and the kingpin plate of the trailer rides on and pivots on the upper surface of the receiver.

In a gooseneck trailer hitch arrangement, a hitch ball is mounted in or on the floor of a pickup bed. The trailer has a long tongue portion which is curved and takes on the general shape of a goose's neck, thereby deriving its name. At a distal end of the tongue portion, a hitch ball coupler is located for receiving the ball portion of the hitch ball and coupling the trailer thereto. Both hitch type arrangements have the benefit of being able to tow greater loads than bumper pulled trailers by virtue of their geometry, as the load is passed directly onto the rear axle of the truck instead of onto the bumper.

While these arrangements both have various benefits, a drawback to both is their incompatibility with one another. For example, an owner of a truck having a fifthwheel receiver mounted in the bed of a truck would be unable to tow a gooseneck trailer. Likewise, a truck with a gooseneck hitch ball mounted therein is unable to tow a fifthwheel trailer. Accordingly, it would be beneficial if a device existed that would permit a user to tow both fifthwheel and gooseneck trailers with one vehicle having one hitch arrangement mounted therein.

Another drawback of these arrangements is found mostly when they are employed in short bed trucks. In recent years a trend for truck manufactures has been to increased the size of the cab. This has been done without increasing the overall length of the trucks, thereby resulting in trucks with shorter beds. These new short bed trucks have created a problem with respect to gooseneck and kingpin trailers. The problem is a decrease in the clearance between the nose of the trailer and the rear of the cab of the tow vehicle when the gooseneck or kingpin trailer is coupled with the tow vehicle. Because the bed is shortened, the distance between the hitch ball or fifthwheel receiver and the back of the cab in a short bed truck is shorter than what it would normally be in a truck with a standard length bed. Accordingly, the front of the trailer is now closer to the rear of the cab. Because the front of the trailer is now closer to the rear of the cab, the driver of the short bed tow vehicle cannot make as sharp of turns as a driver of a long bed vehicle.

Therefore, there is a need for a device which permits a user to readily tow a fifthwheel trailer with a tow vehicle having gooseneck trailer hitch mechanism. There also is a need for a device which permits this conversion and which is sturdy, easily manufactured and is effortlessly connected to the fifthwheel trailer without requiring modification of the trailer. There also is need for the ability, if so desired, to permit a user to increase the distance between the tow vehicle and the trailer during use. The present invention overcomes the drawbacks of the prior art and fills these and other needs.

BRIEF SUMMARY OF THE INVENTION

In order to overcome the above-stated problems and limitations, and to achieve the noted advantages, there is provided an adaptor device for coupling to the kingpin of a fifthwheel trailer that permits the fifthwheel trailer to be coupled with the hitch ball of a gooseneck trailer hitch mechanism mounted in the bed of a tow vehicle. The adaptor has an upper portion with a plate-like device that abuts the kingpin plate of the fifthwheel trailer. An opening in the plate of the upper member receives the kingpin and a clamp device is received on the kingpin. Bolts are received through the clamp device to urge the plate member into frictional contact with the kingpin plate to resist movement therebetween during use.

A lower portion of the adaptor mates in telescoping fashion with the upper portion to permit adjustability of the adaptor to accommodate coupling of trucks and trailers of varying heights. The lower portion includes a hitch ball coupler for receiving the hitch ball of the gooseneck trailer hitch mechanism mounted in the bed of the truck. The hitch ball coupler can be mounted forward of the kingpin to provide an offset. In its simplest form, the adaptor device permits coupling a male member of a trailer to a male member of a tow vehicle.

BRIEF DESCRIPTION OF THE SEVERAL VIEWS OF THE DRAWING

The features of the invention noted above are explained in more detail with reference to the embodiments illustrated in the attached drawing figures, in which like reference numerals denote like elements, in which FIGS. 1–7 illustrate an embodiment of the present invention, and in which:

FIG. 1 is a perspective view of a fifthwheel trailer coupled to a tow vehicle having a gooseneck trailer hitch mechanism via an adaptor device/converter mechanism of the present invention;

FIG. 2 is a perspective view of a front and right side of the converter mechanism in use with portions of the tow vehicle and trailer cutaway for clarity;

FIG. 3 is an exploded perspective view of a left side of the converter mechanism in a disassembled arrangement with the bolts of the converter mechanism omitted for clarity;

FIG. 4 is a left side elevational view of the converter mechanism in FIG. 2 with a portion of the converter mechanism and the trailer cutaway for clarity;

FIG. 5 is a front elevational view of the converter mechanism in FIG. 2 with a portion of the converter mechanism and the trailer cutaway for clarity;

FIG. 6 is a bottom perspective view of a clamp member of the converter mechanism; and FIG. 7 is a side elevational view of the clamp member taken along line 7—7 of FIG. 6.

DETAILED DESCRIPTION OF THE INVENTION

Figure 1:
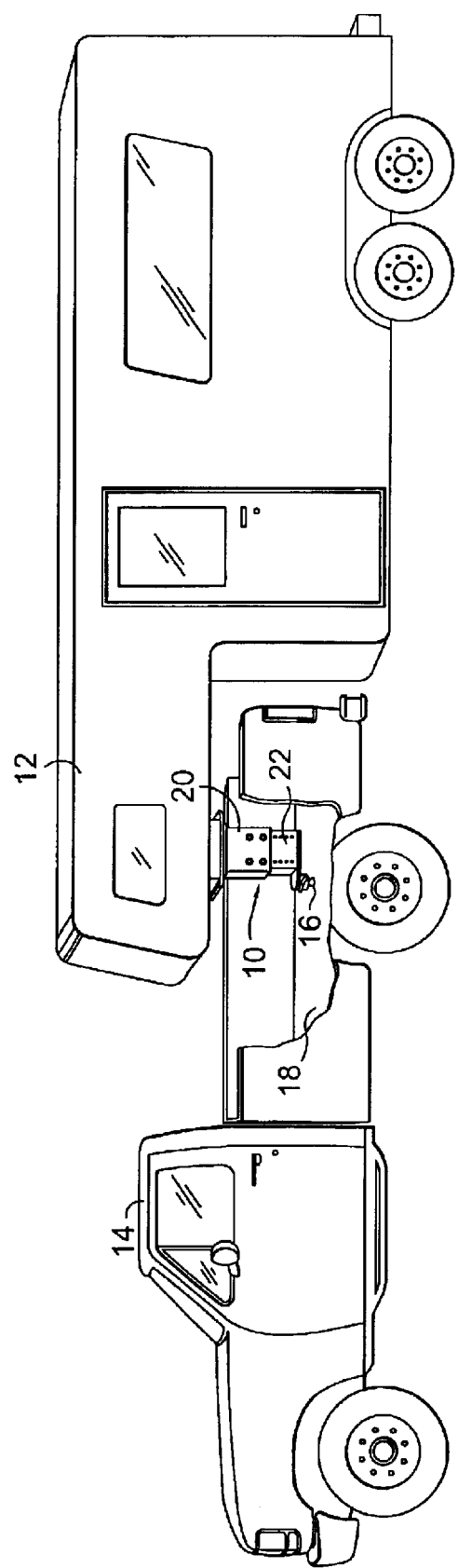
Figure 2:
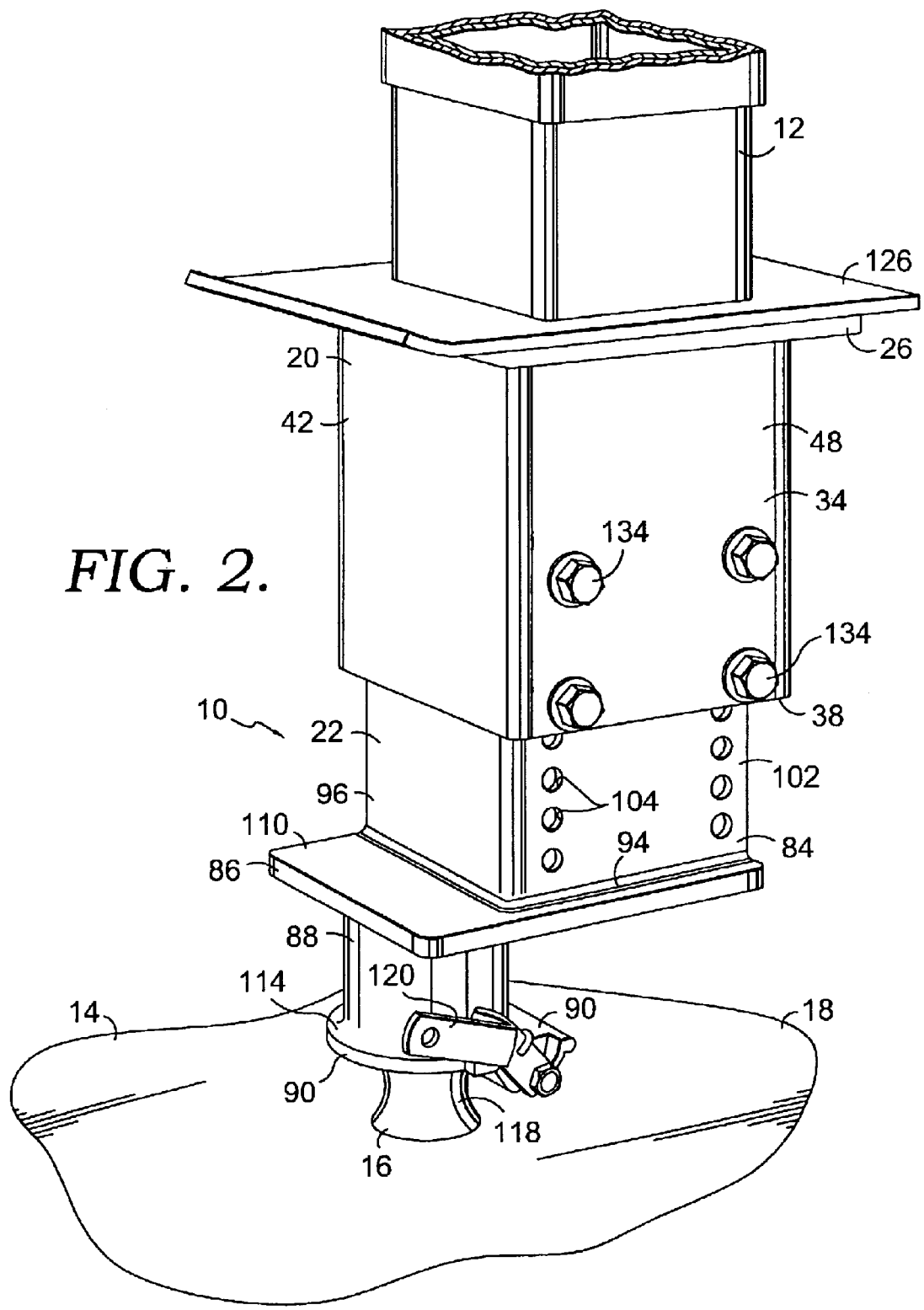

Referring now to the drawings in more detail and initially to FIG. 1, numeral 10 generally designates an adaptor device/converter mechanism constructed in accordance with the present invention. The converter mechanism 10 is designed to permit a fifthwheel trailer 12 to be coupled to a tow vehicle 14, such as the illustrated truck, having a gooseneck trailer hitch mechanism 16 mounted in a bed 18 thereof. The converter 10 includes an upper portion 20, a lower portion 22 and a clamp assembly 24 (see FIG. 3).

Figure 3:
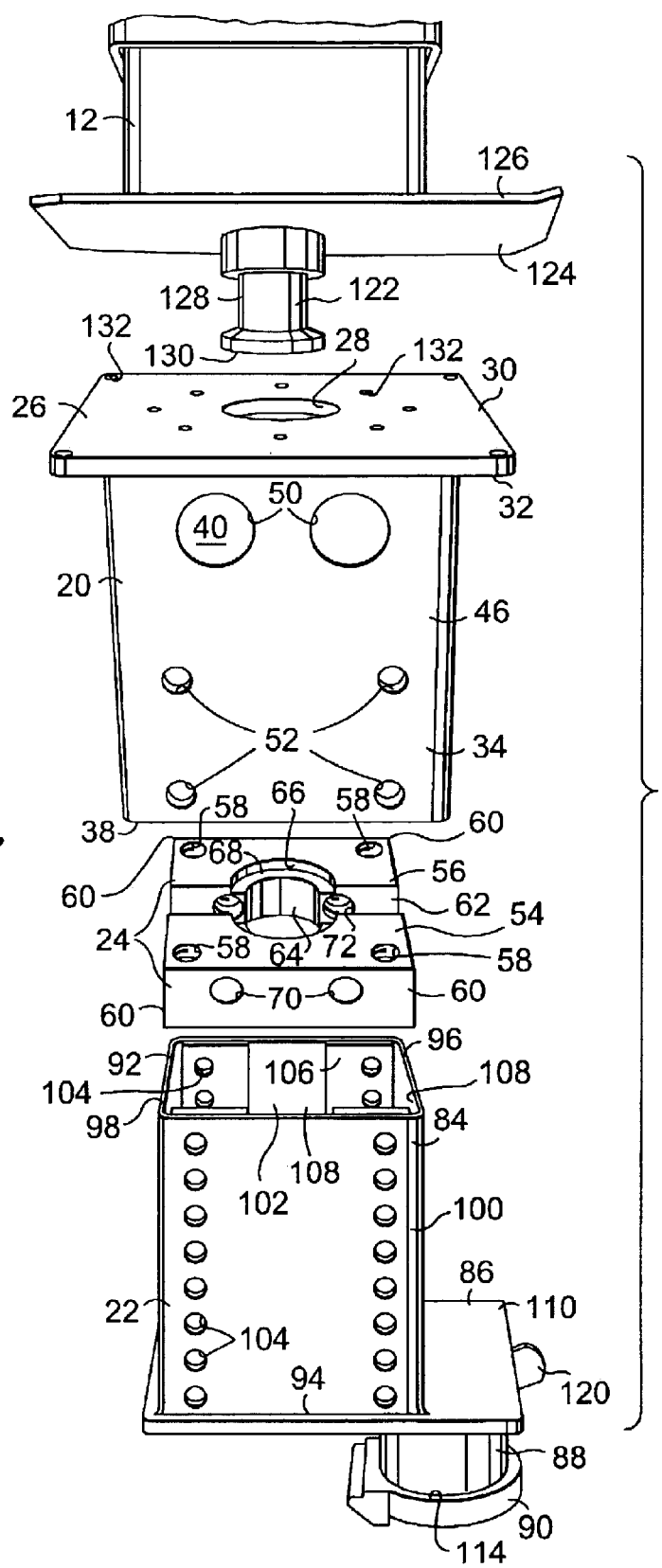
Figure 4:
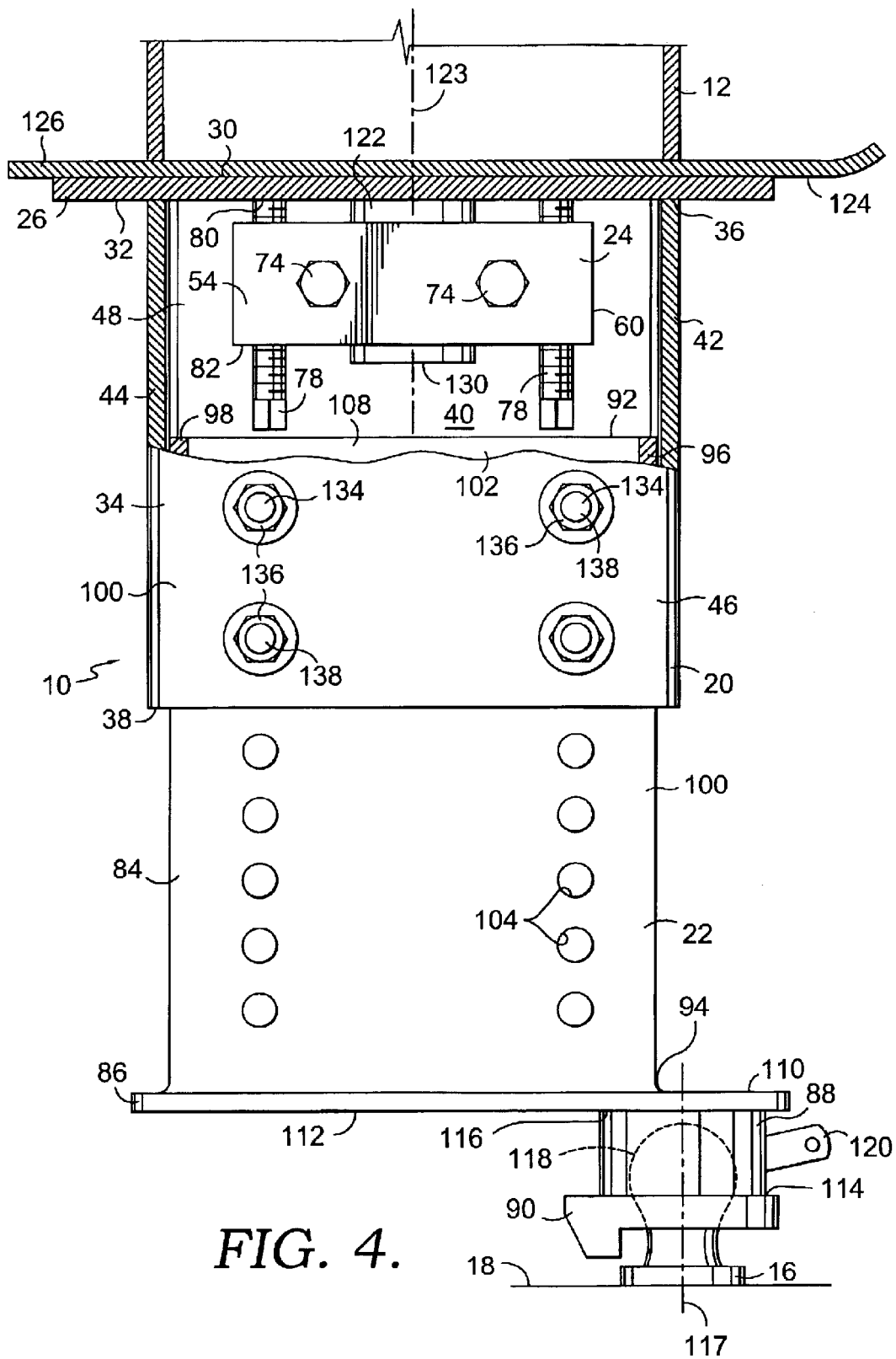

Looking now at FIG. 3, the upper portion 20 includes a plate member 26 having an opening 28 therein. The plate member 26 has an upper surface 30 and a lower surface 32. The upper portion 20 also includes a body portion 34. The body portion 34 is generally tubular in nature and includes a proximal end 36 (see FIG. 4) and a distal end 38. The body portion 34 is connected to the plate member 26, preferably by welding the proximal end 36 of the body portion 34 to the lower surface 32 of the plate member 26. The plate member 26 and the body portion 34 cooperate to define a cavity 40 inside the body portion 34.

The body portion 34 preferably has four sidewalls, namely, a front sidewall 42, a rear sidewall 44, a left sidewall 46 and a right sidewall 48. The left sidewall 46, in the embodiment of the present invention illustrated in the accompanying drawing, preferably includes a pair of holes 50 therein adjacent the proximal end 36 of the body portion 34. It would be readily understood by one of ordinary skill in the art that the holes 50 could be put in any sidewall or even omitted. The holes 50 are provided to permit the user access to the clamp assembly 24 when the mechanism 10 is coupled with the trailer 12, as more fully described below. The body portion 34 also preferably includes a set of bores 52 therethrough. The bores 52 preferably provide straight passages through the body portion 34 and, in the embodiment illustrated, are shown as four bores in the left sidewall 46 with a set of corresponding aligned four bores 52 in the right sidewall 48. The purpose of the bores 52 will be discussed in greater detail below.

The clamp assembly 24 preferably includes a first block member 54 and a second block member 56. The block members 54, 56 are preferably machined from solid metal stock and are generally rectangular in shape. Each of the block members 54, 56 preferably have a pair of generally vertical passages 58 therethrough adjacent outer corners 60 thereof. The passages 58 are preferably internally threaded. The block members 54, 56 also each have an inner surface 62. The inner surfaces 62 face one another when the clamp assembly 24 is assembled during use. Each of the block members 54, 56 also preferably include a generally semi-cylindrical groove 64 in their inner surfaces 62. The groove 64 include an enlarged radius portion 66 that provides a ledge 68 that will be discussed in greater detail below. In machining the generally semi-cylindrical grooves 64 in the block members 54, 56, it has been found beneficial to put the block members 54, 56 together (with the inner surfaces 62 facing one another) with a spacer sandwiched therebetween and drill a vertical bore through the assembled unit. Because the generally semi-cylindrical grooves 64 are formed in the block members 54, 56 with a spacer (not shown) therebetween, when the clamp assembly 24 is coupled to the kingpin of the trailer (as discussed in greater detail below) the inner surfaces 62 of the block members 54, 56 are spaced apart the thickness of the spacer. This permits tighter clamping of the block members 54, 56 to the kingpin as discussed below.

The first block member 54 includes a pair of generally horizontal tunnels 70 therethrough. The tunnels 70 are generally parallel and exit the inner surface 62 on opposite sides of the groove 64. The tunnels 70 are preferably not internally threaded. The second block member preferably includes a pair of generally horizontal bores 72 in the inner surface 62 thereof. The bores 72 are preferably aligned and coaxial with the tunnels 70 in the first block member 54. Additionally, the bores 72 are preferably internally threaded to receive bolts 74. The bolts 74 are received in the tunnels 70 such that distill ends 76 of the bolts 74 are threadably received in the bores 72 of the second block member 56. A plurality of bolts 78 are preferably threadably received in the vertical passages 58 of the block members 54, 56. The bolts 78 are preferably received in the vertical passages 58 by placing distal ends 80 of the bolts 78 in portions of the vertical passages 58 accessible from lower surfaces 82 of the block members 54, 56 so that the bolts 78 are pointing upwardly.

Returning to FIG. 3, the lower portion 22 has a body member 84, a base plate 86, a housing 88 and a hitch ball coupler 90. The bottom member 84 is preferably tubular in nature and is sized to couple with the body portion 34 of the upper portion 20 in sliding and telescoping fashion. In the embodiment illustrated, the outer circumference of the body member 84 is slightly less than the inner circumference of the body portion 34 such that the body member 84 of the lower portion is slidably received in the body portion 34 of the upper portion 20. It is within the scope of the present invention to make the lower portion 22 the larger part to receive a smaller upper portion 20.

The body member has a distal end 92, a proximal end 94 and, like the body portion 34, four sidewalls, namely, a front sidewall 96, a rear sidewall 98, a left sidewall 100 and a right sidewall 102. The left and right sidewalls 100, 102 include a plurality of apertures 104 therein. The apertures 104 are preferably evenly spaced and are provided in vertical columns such that the apertures 104 can be selectively aligned with the bores 52 in the body portion 34 when the upper and lower portions are mated in telescoping fashion (see FIGS. 1,2,4 and 5). The apertures 104 and left and right sidewalls 100, 102 can be reinforced by welding strips 106 to an inner surface 108 of the body member 84.

The base plate 86 has an upper surface 110 and a lower surface 112. The base plate 86 is preferably coupled with the body member 84 by welding the two pieces together such that the proximal end 94 of the body member 84 abuts the upper surface 110 of the base plate 86. The housing 88 also preferably has a distal end 114, a proximal end 116 and a central longitudinal axis 117. The housing 88 is coupled with the base plate 86 preferably by welding the pieces together such that the proximal end 116 abuts the lower surface 112 of the base plate 86. The hitch ball coupler 90 is, in turn, coupled with the distal end 114 of the housing 88. The hitch ball coupler 90 can be any of a number of commercially available units designed to receive a hitch ball 118 of a gooseneck trailer hitch mechanism 16. These hitch ball couplers 90 generally have a lever 120 that permits a user to selectively secure the hitch ball 118 in the hitch ball coupler 90.

The trailer 12 has a kingpin 122 with a central longitudinal axis 123. While the housing 88 could be coupled with the lower surface 112 of the base plate 86 directly below the kingpin 122, such that the central longitudinal axis 117 of the housing 88 and the central longitudinal axis 123 of the kingpin 122 are coaxial, it has been found beneficial, in some instances, to move the housing forward on the base plate 86 to provide an offset. The offset (i.e., the distance the preferably parallel longitudinal axes 117 and 123 are spaced apart) is preferably between zero to twelve inches and is more preferably between three to nine inches. An offset of five inches has been found beneficial in alleviating or overcoming many of the drawbacks mentioned above associated with the use of a gooseneck trailer hitch mechanism 16 in a short bed truck.

In use, a user should first attach the converter mechanism 10 to the trailer 12 and then couple the tow vehicle 14 with the converter 10 to permit towing of the trailer 12. The kingpin 122 depends downwardly from a lower surface 124 of a kingpin plate 126. The kingpin 122 is generally cylindrical in nature and includes a reduced diameter portion 128 adjacent a distal end 130 of the kingpin 122.

Figure 5:
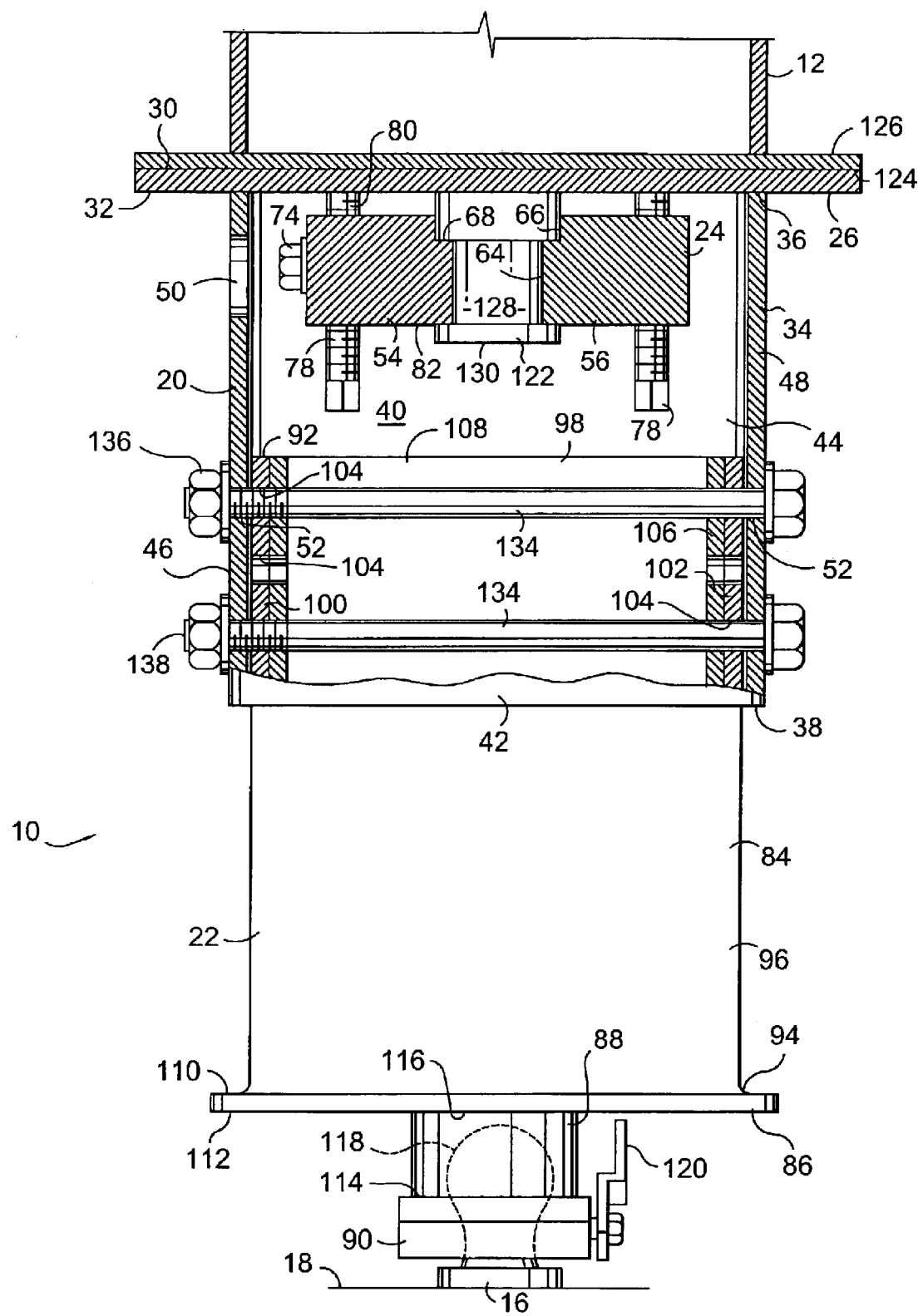
Figure 6:
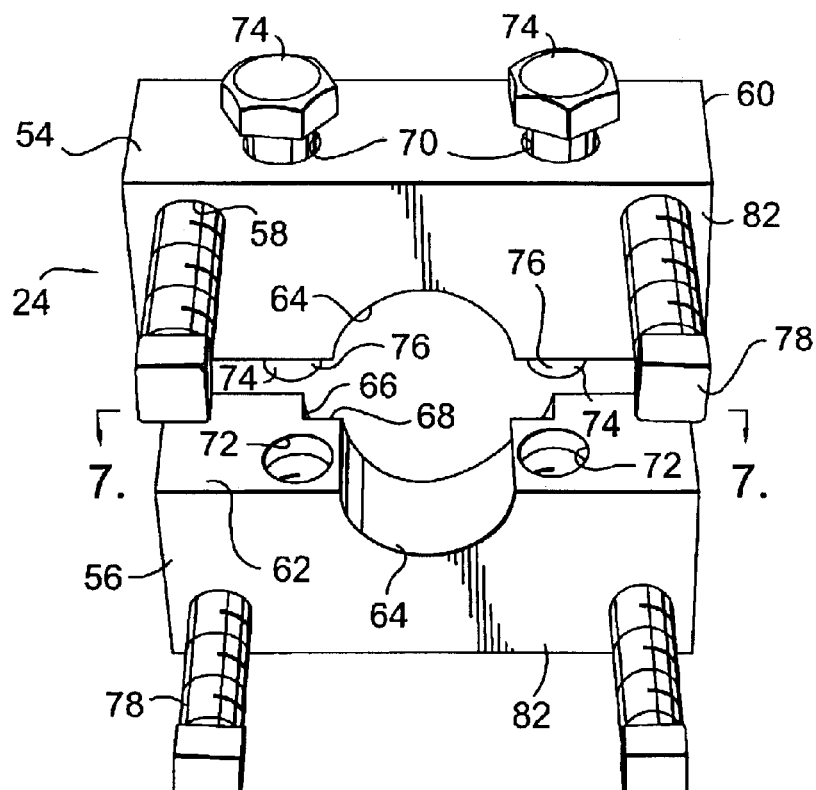
Figure 7:
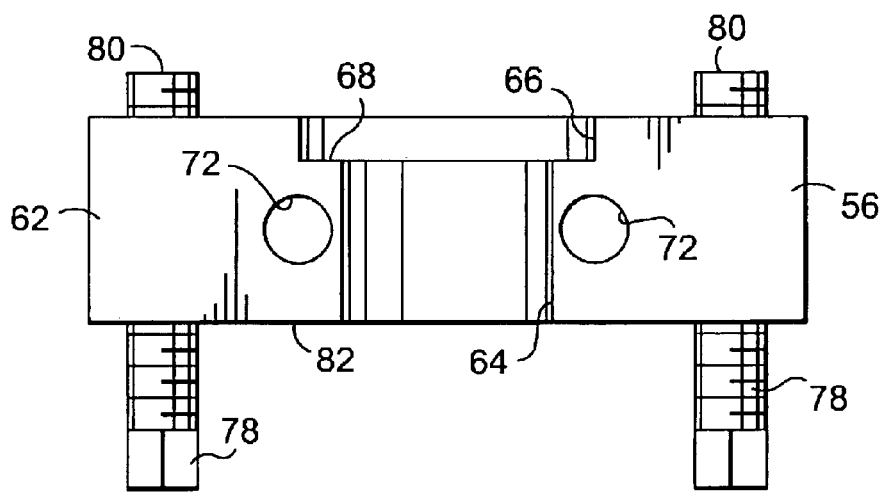

To couple the converter mechanism 10 with the trailer 12, the kingpin 122 is received in the opening 28 in the plate member 26 of the upper portion 20 such that the distal end 130 of the kingpin 122 is in the cavity 40 of the upper portion 20. The opening 28 preferably has a circumference slightly larger than an outer diameter of the kingpin 122 adjacent the lower surface 124 of the kingpin plate 126. The block members 54, 56 are inserted up into the cavity 40 and then placed on opposite sides of the kingpin 122 so that the semi-cylindrical grooves 64 abut and generally encircle the reduced diameter portion 128 of the kingpin 122. The enlarged radius portions 66 of the block members 54, 56 preferably receive a portion of the kingpin 122 above the reduced diameter portion 128, as illustrated in FIG. 5. The block members 54, 56 are positioned on the kingpin 122 such that the heads of the bolts 74 are accessible through the holes 50 in the left sidewall 46 of the upper portion 20.

The user then tightens the bolts 74 thereby drawing the block members 54, 56 together generally around the kingpin 122 and clamping the clamp assembly 24 onto the kingpin 122. The user then reaches up into the cavity 40 of the upper portion 20 through its distal end 38 to access the vertical bolts 78. The user then screws the bolts 78 further into the clamp assembly 24 until the distal ends 80 of the bolts 78 abut the lower surface 32 of the plate member 26. As the user continues to tighten the bolts 78, the bolts 78 force the plate member 26 away from the clamp assembly 24 and into contact with a trailer 12 such that the upper surface 30 of the plate member 26 abuts the lower surface 124 of the kingpin plate 126. The more the user tightens the bolts 78, the greater the force pressing the plate member 26 in contact with the kingpin plate 126. This force creates a frictional relationship that will resist movement there between during use. Additionally, the plate member 26 can be provided with a plurality of guide holes 132. The user can, for a more secure connection between the converter mechanism 10 and the trailer 12, use the guide holes 132 as a guide to drill holes up into the kingpin plate 126. The user can then use self-tapping bolts (not shown) through guide holes 132 up into the holes drilled in the kingpin plate.

Once the upper portion 20 and the clamp assembly 24 are coupled with the trailer 12, the body member 84 of the lower portion 22 is slidably received up into the body portion 34 of the upper portion 20 and into the cavity 40. When the hitch ball coupler 90 is a desired distance away from the kingpin 122, a plurality of long bolts 134 are used to fix the relationship between the upper portion 20 and the lower portion 22 and thereby secure the lower portion 22 to the upper portion 20.

In the illustrated embodiment, four bolts 134 are passed through the bores 52 in the left sidewall 46 of the body portion 34, then through the apertures 104 in the left sidewall 100 of the body member 84, then through the cavity 40, then through the apertures 104 in the right sidewall 102, and then out the bores 52 in the right sidewall 48 of the body portion 34. Nuts 136 are then received on distal ends 138 of the bolts 134 to hold them in place. The trailer 12 now essentially functions as any other gooseneck trailer. A user can now couple their tow vehicle 14 with a gooseneck trailer hitch mechanism 16 to the trailer 12 in the same manner they would couple any regular gooseneck trailer (i.e., to the hitch ball 118).

Many variations can be made to the illustrated embodiment of the present invention without departing from the scope of the present invention. Such modifications are within the scope of the present invention. For example, in an alternate embodiment, the four long bolts 134 that span the mechanism 10 could be replaced with eight short bolts (not shown). In this arrangement, the apertures 104 would be internally threaded and each of the eight short bolts would be received in an aperture 104 through a sidewall of the upper portion 20 (i.e., four through the bores 52 in the left sidewall 46 and four through the bores 52 in the right sidewall 48). The strips 106 would then serve the added function of providing additional threads to receive the shorter bolts. In this arrangement, the nuts 136 would be omitted.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. A converter mechanism for coupling a fifth wheel trailer having a kingpin extending downwardly from a kingpin plate to a tow vehicle having a gooseneck trailer hitch, the mechanism comprising:

a plate member having an opening therein for receiving the kingpin of the fifth wheel trailer;

a clamp member for coupling with the kingpin of the fifth wheel trailer when the kingpin is received in the opening in the plate member, the clamp being in a spaced relationship from the plate member;

a base member coupled with the plate member, the base member having a lower portion including a gooseneck hitch ball coupler; and an adjustable means for urging the plate member against the trailer kingpin plate to resist movement there between, wherein at least a portion of the adjustable means for urging extends between the clamp member and the plate member.

2. The mechanism of claim 1, wherein the adjustable means for urging the plate member against the trailer kingpin plate includes a bolt threadably received in a bore in the clamp member.

3. The mechanism of claim 2, further comprising a body, wherein the body is connected with the plate member and extends downwardly therefrom, and wherein the base member is coupled with the plate member and spaced apart therefrom via the body.

4. The mechanism of claim 3, wherein the body and the base member couple in telescoping fashion, wherein both the body and the base member include a plurality of bores therein and wherein the telescoping relationship between the body and base member can be selectively fixed by receiving a pin through a pair of aligned holes in the body and base member.

5. The mechanism of claim 4, wherein the body is generally tubular in shape, and wherein an upper portion of the base member is generally tubular in shape.

6. The mechanism of claim 1, wherein the clamp member has first and second portions, and wherein the first and second portions cooperate to clamp the clamp member to the kingpin of the trailer.

7. The mechanism of claim 6, wherein the first and second portions of the clamp member are generally block shape members, each having an inner sidewall, wherein each of the inner sidewalls have a semi-cylindrical groove therein for receiving a reduced diameter portion of the kingpin when the clamp member is received on the kingpin and wherein each of the inner sidewalls face each other in use.

8. The mechanism of claim 7, wherein the clamp member further includes two generally horizontal bores therein and two bolts, wherein the two bolts of the clamp member are received in the bores in the clamp member to draw the first and second portions of the clamp member together around the kingpin.

9. A converter mechanism for coupling a fifth wheel trailer having a kingpin extending downwardly from a kingpin plate to a tow vehicle having a gooseneck trailer hitch having a ball member extending upwardly therefrom, the mechanism comprising:

an upper member having a plate member with a body member coupled thereto and extending downwardly therefrom, wherein the plate member has an opening therein for receiving the kingpin of the fifth wheel trailer, wherein the plate and body members cooperate to define a cavity, and wherein a lower portion of the kingpin is in the cavity when the king pin is received in the opening in the plate member;

a clamp member for coupling with the kingpin of the fifth wheel trailer when the kingpin is received in the opening in the plate member, the clamp being in a spaced relationship from the plate member, wherein the clamp member has first and second portions and at least one tightening member for drawing the first and second portions together around a reduced diameter portion of the kingpin to clamp the clamp member thereto;

a base member selectively coupled with the upper member, the base member having a lower portion including a gooseneck hitch ball coupler for selectively receiving the ball member of the tow vehicle; and an adjustable means for urging the plate member against the trailer kingpin plate to resist movement there between.

10. The mechanism of claim 9, wherein the at least one tightening member is a first bolt.

11. The mechanism of claim 10, wherein the first and second portions of the clamp member are generally block shaped with a sidewall having a semi-cylindrical groove therein, wherein the semi-cylindrical grooves in the sidewalls of the first and second portions of the clamp member cooperate to provide a generally cylindrical passage through the clamp member, and wherein the generally cylindrical passage is sized to receive the reduced diameter portion of the kingpin.

12. The mechanism of claim 11, wherein the first and second portions further include two generally horizontal bores in the first and second portions of the clamp member and a second bolt, wherein the two generally horizontal bores in the first portion align with the two generally horizontal bores in the second portion to provide two sets of aligned bores when the reduced diameter portion of the kingpin is received in the generally cylindrical passage, wherein the first and second bolts are received in the aligned bores, and wherein the first and second portions of the clamp member may be drawn together around the kingpin to clamp the clamp member thereon by tightening the first and second bolts.

13. The mechanism of claim 12, wherein the adjustable means for urging the plate member against the trailer kingpin plate includes a third bolt extending between the plate member and the clamp member, whereby tightening the third bolt moves the plate member away from the clamp member.

14. The mechanism of claim 13, wherein the adjustable means for urging the plate member against the trailer kingpin plate further includes a first generally vertical bore through the clamp member, and wherein the third bolt is received in the first generally vertical bore.

15. The mechanism of claim 14, wherein the generally vertical bore is through the first portion of the clamp member, wherein the adjustable means for urging the plate member against the trailer kingpin plate further includes a second generally vertical bore through the first portion of the clamp member, third and forth generally vertical bores through the second portion of the clamp member and fourth, fifth and sixth bolts received in the second, third and fourth generally vertical bores, respectively.

16. The mechanism of claim 9, wherein the body member of the upper member is generally tubular in nature, wherein the base member has a generally tubular body portion above the lower portion, and wherein the body portion of the base member and the body member of the upper member cooperate in telescoping fashion to permit a user to selectively vary a height dimension between the plate member and the gooseneck hitch ball coupler.

17. The mechanism of claim 16, wherein the body portion and the body member have a plurality of bores therein and wherein the telescoping relationship between the body and base member can be selectively fixed by receiving a pin through a pair of aligned holes in the body and base member.

18. A converter mechanism for coupling a fifth wheel trailer having a kingpin extending downwardly from a kingpin plate to a tow vehicle having a gooseneck trailer hitch having a ball member extending upwardly therefrom, the mechanism comprising:

an upper member having a plate member with a body member coupled thereto and extending downwardly therefrom, wherein the plate member has an opening therein for receiving the kingpin of the fifth wheel trailer, wherein the plate and body members cooperate to define a cavity, and wherein a lower portion of the kingpin is in the cavity when the king pin is received in the opening in the plate member;

a clamp member for coupling with the kingpin of the fifth wheel trailer when the kingpin is received in the opening in the plate member, the clamp being in a spaced relationship from the plate member, wherein the clamp member has first and second portions, each of said portions adapted to conform to a portion of the shape of a reduced diameter portion of the kingpin;

means for drawing the first and second portions together and in abutting contact with the reduced diameter portion of the kingpin to clamp the clamp member thereto;

a base member selectively coupled with the upper member, the base member having a lower portion including a gooseneck hitch ball coupler for selectively receiving the ball member of the tow vehicle; and means for urging the plate member against the trailer kingpin plate to resist movement there between.

19. The mechanism of claim 18, further including:

adjustable means for varying the distance between the plate member of the upper member and the gooseneck hitch ball coupler of the base member.

20. The mechanism of claim 19, wherein the means for urging the plate member against the kingpin plate includes at least one bolt threadably received in a bore in the clamp member and extending between the clamp member and the plate member, wherein the adjustable means for varying the distance between the plate member and the gooseneck hitch ball coupler includes a plurality of vertically spaced apertures in at least one of the upper member and the lower member for receiving bolts therein, and wherein the means for drawing the first and second portions together includes at least one bolt extending between the first and second portions of the clamp member.

* * * * *